Mar. 6, 1923.
E. S. McMILLEN
1,447,393
CONVERTIBLE VEHICLE
Filed Sept. 29, 1921
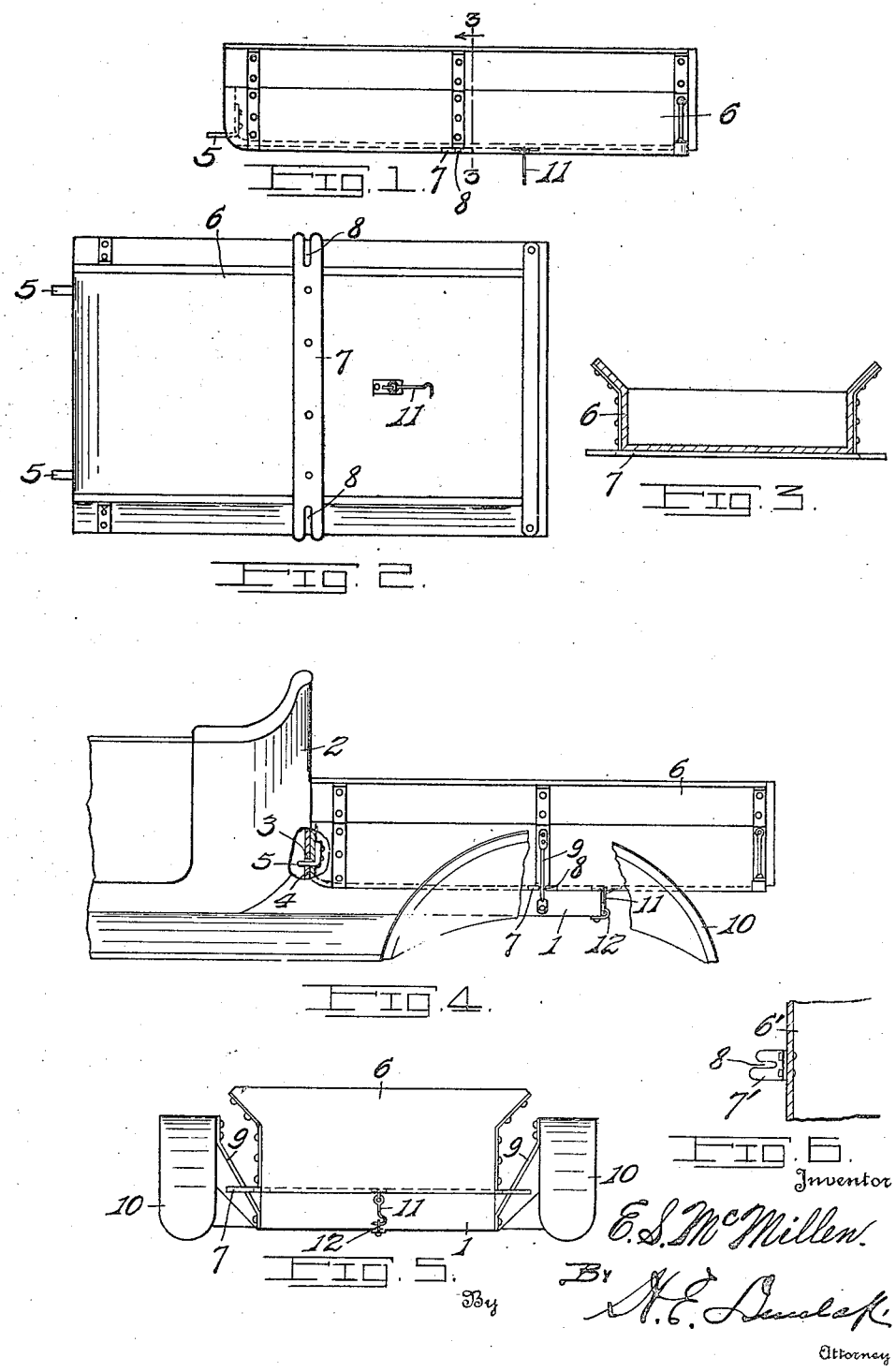
Inventor
E. S. McMillen.
By
H. E. Dunlap.
Attorney Patented Mar. 6, 1923.

1,447,393

UNITED STATES PATENT OFFICE.

EUCLID S. McMILLEN, OF BETHESDA, OHIO.

CONVERTIBLE VEHICLE.

Application filed September 29, 1921. Serial No. 504,106.

*To all whom it may concern:*

Be it known that I, EUCLID S. MCMILLEN, a citizen of the United States of America, and resident of Bethesda, county of Belmont, and State of Ohio, have invented certain new and useful Improvements in Convertible Vehicles, of which the following is a specification.

This invention relates broadly to automobile bodies, and it has for its primary object to provide a delivery-truck body adapted to be readily interchanged for the usual boot of cars of the Ford runabout or roadster type.

A further object is to provide a lightweight delivery body which may be quickly and conveniently mounted upon the frame or chassis of an automobile rearward of the driver's seat and which is rigidly, but detachably, held against movement without the employment of the usual attaching bolts.

With these and other objects in view, the invention resides in the features of construction, arrangement of parts and combinations of elements which will hereinafter be fully described, reference being had to the accompanying drawings, in which—

Figure 1 is a side elevation of the delivery body, detached;

Figure 2 is an under side elevation of the same;

Figure 3 is a section on line 3—3, Fig. 1;

Figure 4 is a side elevation of an automobile equipped with the invention, a portion of a rear fender being shown broken away;

Figure 5 is a rear end elevation of the same; and—

Figure 6 is a detail view in horizontal section showing a modified form of device for interengaging the fender brace carried by the body.

Referring to said drawings, 1 indicates generally that portion of an automobile frame located rearward of the driver's seat 2 and which, in Ford cars of runabout or roadster type, is surmounted by a boot. In the present embodiment of the invention, two or more recesses or apertures 3 are provided in the lower part of the rear wall or back 4 of the seat 2 for the reception of metal tongues 5 which are rigidly mounted upon and project forward from the front end of a box-like delivery body 6 which, generally considered, may be of any preferred form. Said body is designed to seat upon the platform constituted by the portion 1 of the frame, with its front end conformably fitted to the back 4 of the seat 2 and with its rear end extending a suitable distance rearward of said platform.

Rigidly attached to the under side or bottom of the body 6 is a transversely extending bar 7 having its opposite end portions projecting outward beyond the sides of said body; and provided in said projecting end portions are open slots 8 designed for the reception of the usual braces 9 which serve, in Ford cars, to support and brace the rear wheel fenders 10. As is manifest, said bar 7 is positioned on the body so that, when the latter is properly seated, the slots 8 of its ends will accurately register with the positions occupied by said fender braces. Obviously, said bar 7 and the fender braces 9 coact to maintain the body against longitudinal shifting movement, while lateral shifting is prevented both by said braces and by the tongues 5 engaged, as aforesaid, in the apertures 3.

To prevent vertical bouncing or jostling movement of the body, any preferred form of latch mechanism may be interposed between said body and the chassis frame. That herein shown for illustrative purposes comprises a latch hook 11 attached to and depending from the under side of the body, and a staple or staple-like bar 12 fixed on the rear end of the frame and with the eye portion of which said hook is engageable.

As is apparent, the bar 7 may be dispensed with and slotted lugs 7' substituted therefor, as shown in Fig. 6, said lugs being of angle form and bolted to the sides of the body 6'.

From the foregoing it will be understood that the body is secured in place by a single fastening and that, consequently, the application and removal of the body may be accomplished in a minimum of time and with a minimum of effort.

What is claimed is—

The combination with an automobile frame having a seat thereon provided with apertures in the lower back portion thereof, a platform located rearward of said seat, and braces extending laterally from said frame to the rear wheel fenders, of a delivery body detachably mounted on said platform, laterally extending members rigidly carried by said body and provided with open slots in which said braces are received, tongues carried by the front end of said body received by said apertures for securing the body against lateral and vertical movements, and latch mechanism between said body and the rear end of said platform.

In testimony whereof, I affix my signature in presence of two subscribing witnesses.

EUCLID S. McMILLEN.

Witnesses:
CHAS. C. LAWS,
W. D. BOLON.